United States Patent
von Langsdorff

(10) Patent No.: US 10,767,321 B2
(45) Date of Patent: Sep. 8, 2020

(54) INTEGRATED PAVEMENT SYSTEMS FOR COLLECTING AND RECYCLING DE-ICING FLUID

(71) Applicant: F. von Langsdorff Licensing Limited, Caledon (CA)

(72) Inventor: Harald von Langsdorff, Caledon (CA)

(73) Assignee: F. von Langsdorff Licensing Limited, Caledon (CA)

( * ) Notice: Subject to any disclaimer, the term of this patent is extended or adjusted under 35 U.S.C. 154(b) by 0 days.

(21) Appl. No.: 16/125,687

(22) Filed: Sep. 8, 2018

(65) Prior Publication Data

US 2019/0078269 A1    Mar. 14, 2019

Related U.S. Application Data

(60) Provisional application No. 62/555,878, filed on Sep. 8, 2017.

(51) Int. Cl.

| | | |
|---|---|---|
| *E01C 11/24* | (2006.01) | |
| *E01C 5/06* | (2006.01) | |
| *B05B 14/00* | (2018.01) | |
| *B05B 12/00* | (2018.01) | |
| *E01C 7/14* | (2006.01) | |

(Continued)

(52) U.S. Cl.
CPC ............ *E01C 11/24* (2013.01); *B05B 12/004* (2013.01); *B05B 14/00* (2018.02); *E01C 5/06* (2013.01); *E01C 7/14* (2013.01); *E01C 7/18* (2013.01); *E01C 11/245* (2013.01); *B05B 12/081* (2013.01); *B05B 12/12* (2013.01);

(Continued)

(58) Field of Classification Search
CPC ........ E01C 11/265; E01C 11/26; E01C 11/24; E01C 11/245; E01C 7/26; E01C 7/14; E01C 5/06; E01C 7/18
See application file for complete search history.

(56) References Cited

U.S. PATENT DOCUMENTS 2,617,597 A * 11/1952 Bonilla .................... E01C 11/26
237/1 R
3,540,655 A * 11/1970 Hinrichs .................. E01H 3/04
239/75

(Continued)

FOREIGN PATENT DOCUMENTS

| EP | 0 458 992 A1 | 12/1991 |
|---|---|---|
| EP | 0 704 573 A2 | 4/1996 |

(Continued)

OTHER PUBLICATIONS

English Machine Translation JP2006225861. Printed Oct. 23, 2019 (Year: 2006).*

(Continued)

*Primary Examiner* — Abigail A Risic
(74) *Attorney, Agent, or Firm* — Cahn & Samuels, LLP

(57) ABSTRACT

An integrated ground surface system is provided for collecting and recycling de-icing fluid. The system includes: a permeable ground surface layer; a containment area located below the permeable ground surface layer, and comprising an impermeable liner to collect the de-icing fluid; a reservoir in fluidic communication with the containment area for storing the de-icing fluid; and an applicator device in fluidic communication with the reservoir to dispense the de-icing fluid.

20 Claims, 11 Drawing Sheets

(51) Int. Cl.
  *E01C 7/18* (2006.01)
  *B05B 12/12* (2006.01)
  *E01C 11/22* (2006.01)
  *B05B 12/08* (2006.01)

(52) U.S. Cl.
  CPC ......... *E01C 11/225* (2013.01); *E01C 2201/14* (2013.01); *E01C 2201/20* (2013.01)

(56) References Cited

U.S. PATENT DOCUMENTS

| | | | |
|---|---|---|---|
| 5,192,426 A | | 3/1993 | DeCoster et al. |
| 6,126,083 A | * | 10/2000 | Boschung ............. E01H 10/005 239/1 |
| 6,171,406 B1 | * | 1/2001 | Otsuki ................. B08B 6/00 134/22.1 |
| 6,270,020 B1 | * | 8/2001 | Thompson ............ E01H 10/005 239/172 |
| 7,588,195 B2 | * | 9/2009 | Balogh ................. A01G 25/00 239/201 |
| 3,221,029 A1 | | 7/2012 | Henry et al. |
| 2006/0180678 A1 | * | 8/2006 | Balogh ................. A01G 25/00 239/1 |
| 2011/0290776 A1 | * | 12/2011 | Yoon ..................... E01C 11/26 219/213 |
| 2012/0201603 A1 | * | 8/2012 | Boulton ............... E03B 11/14 405/36 |
| 2016/0032539 A1 | * | 2/2016 | Buch ..................... E01O 5/06 404/3 |
| 2018/0243704 A1 | * | 8/2018 | Koefod .................. G05D 21/02 |
| 2018/0274182 A1 | * | 9/2018 | Buch ...................... C02F 3/046 |
| 2018/0368341 A1 | * | 12/2018 | Wang ..................... A01G 27/006 |

FOREIGN PATENT DOCUMENTS

| | | |
|---|---|---|
| EP | 0 938 615 B1 | 2/2005 |
| JP | 2006225861 A * | 8/2006 |

OTHER PUBLICATIONS

European Patent Office, English abstract for EP 0 458 991 A1, printed on Sep. 8, 2018.

European Patent Office, English abstract for EP 0 704 573 A2, printed on Sep. 8, 2018.

European Patent Office, English abstract for EP 0 938 615 B1, printed on Sep. 8, 2018.

* cited by examiner

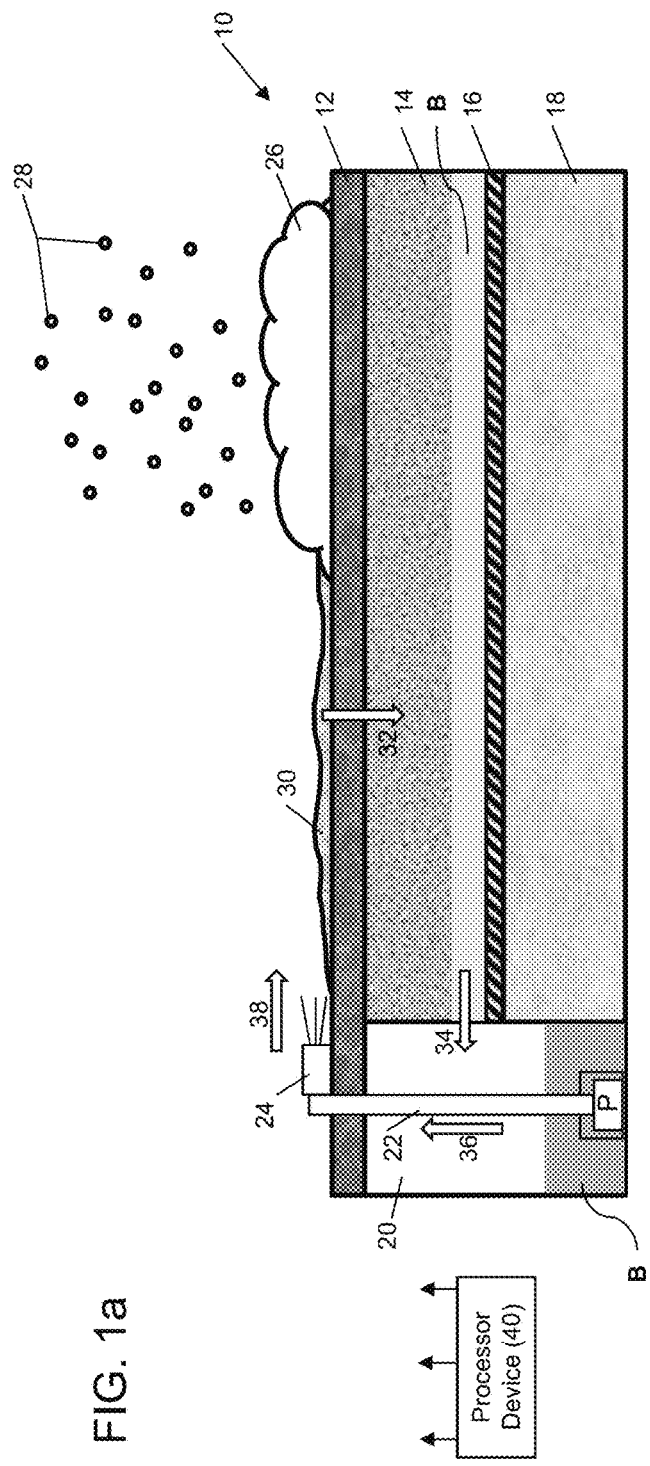
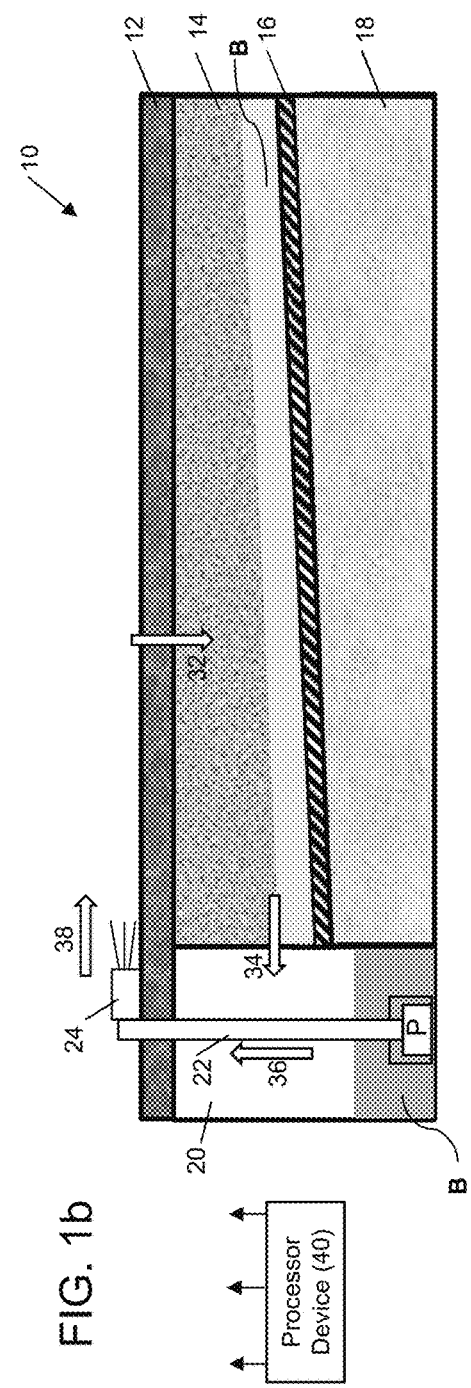
FIG. 1a
FIG. 1b

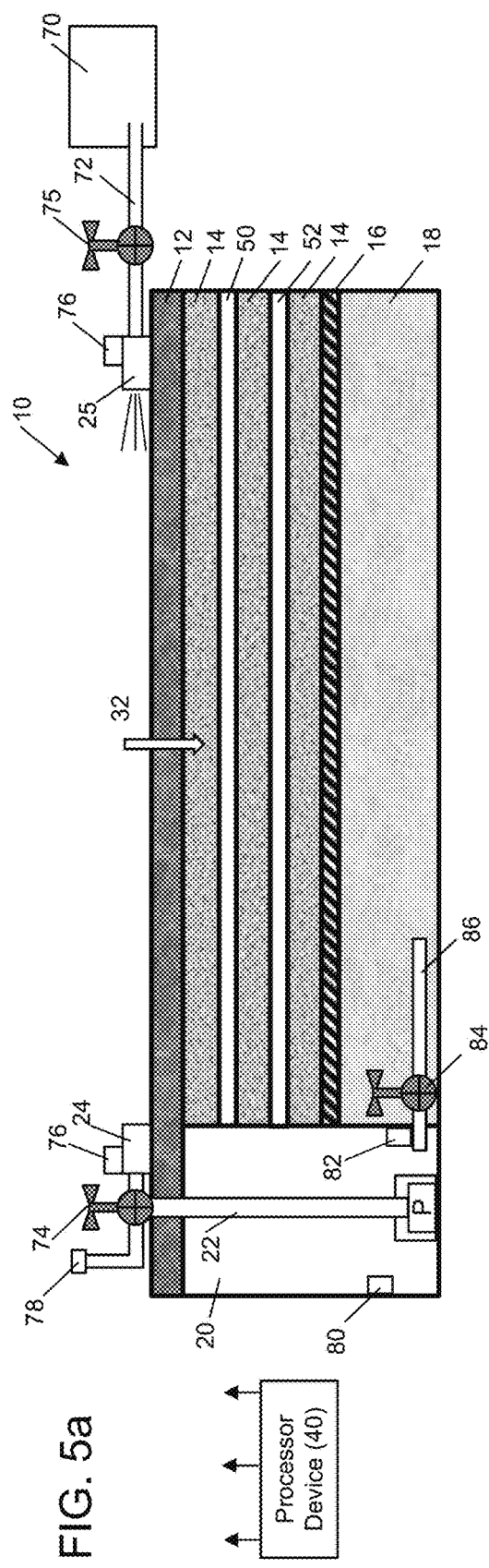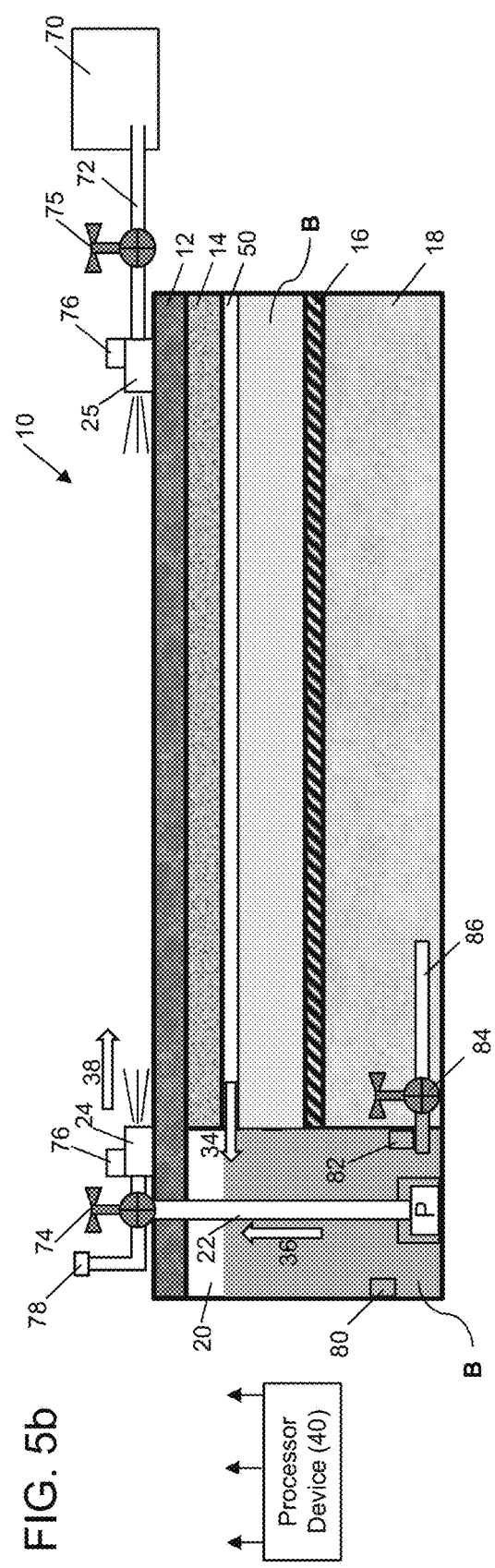

INTEGRATED PAVEMENT SYSTEMS FOR COLLECTING AND RECYCLING DE-ICING FLUID

This application claims priority under the Paris Convention to U.S. application No. 62/555,878, filed on Sep. 8, 2017, the entire contents of which are incorporated herein by reference.

I. TECHNICAL FIELD

The following relates generally to an integrated ground surface system for collecting and recycling de-icing fluid.

II. BACKGROUND

The combination of moisture, such as precipitation, and cold temperatures can lead to the formation of slippery surfaces. Non-limiting examples of surfaces include walkways, sidewalks, court yards, parking lots, driveways, roads and runways. Pedestrians and commuters alike risk injury when traveling over such surfaces. There are a variety of approaches that address this issue. One example is the application of de-icing compounds to a surface, lowering the freezing temperature of water. This is known to reduce the formation of ice and improve traction of the surface.

The most common de-icing compound used for this purpose is rock salt (alternatively chloride salts or road salts). The salt, in its solid state, may be applied to various surfaces. Upon application, the salt dissolves in the snow, ice, or water, on the surface, forming a salt water compound that has a lower freezing temperature.

More recently, transportation departments have begun to apply salt brine to their roads and walkways. Salt brine can be any liquid salt mixture and is sprayed on the surfaces in liquid form. In some cases, salt brine has been applied to surfaces before snow or ice events because it is known to absorb on the surface and reduce the initial accumulation of ice—reducing the burden of snow and ice removal later. In the field, this method is typically referred to as anti-icing.

The runoff mixture of salt and water has been found to have a detrimental impact on the surrounding environment, including, but not limited to, waterways.

In some cases, road authorities have begun to use alternative de-icing compounds including agricultural by-products, such as sugar beet juice, which reduce the amount of salt entering the environment.

While these more recent solutions have been found to reduce the amount of salt applied to the surfaces, they too become waste products that runoff and enter the environment with the melted snow, ice and other water. Currently, people or systems apply new de-icing compounds each time when a ground surface becomes icy or in anticipation thereof and these applied compounds are wasted and drain into the environment or the sewage systems.

U.S. Pat. No. 5,192,426 to Decoster et al. describes a system that collects grey water from a house and ground water, and uses the water to spray surrounding trees and lawn. U.S. Pat. No. 8,221,029 to Henry et al. describes a rainwater collection and harvesting system under artificial turf. However, these systems were intended for the purpose of rainwater collection as opposed to salt brine collection, and are not concerned with slippery surfaces due to cold weather. These U.S. patents do not consider collecting salt brine, and managing the same to reduce waste and environmental impact.

European Patent Nos. 0704573 to Kruss et al., and 0938615 to Lingen describe permeable paving surfaces that collect and hold liquids underground. Both of these European patents do not consider collecting salt brine and managing the same to reduce waste and environmental impact.

European Patent No. 0458992 to Weber discloses a stationary de-icing liquid spray installation. This installation, however, does not consider collecting salt brine and managing the same to reduce waste and environmental impact.

Therefore, it is herein recognized that there is a desire for an integrated pavement system that collects salt brine and addresses one or more of the above deficiencies.

III. SUMMARY OF THE INVENTION

In one aspect, there is provided an integrated ground surface system for collecting and recycling de-icing fluid, the system comprising: a permeable ground surface layer; a containment area located below the permeable ground surface layer, and the containment area including an impermeable liner to collect the de-icing fluid; a reservoir in fluidic communication with the containment area for storing the de-icing fluid; and an applicator device in fluidic communication with the reservoir to dispense the de-icing fluid.

In another aspect, there is provided an integrated ground surface system for collecting and recycling de-icing fluid, the system comprising: a permeable ground surface layer; a containment area located below the permeable ground surface layer, and the containment area including an impermeable liner to collect the de-icing fluid; a reservoir in fluidic communication with the containment area for storing the de-icing fluid; a first applicator device in fluidic communication with the reservoir to dispense the de-icing fluid; a tank that stores de-icing compound; a second applicator device to dispense the de-icing compound from the tank onto the permeable ground surface layer; a dispensing device to dispense the de-icing compound from the tank into the reservoir; and a processor device and one or more sensors that monitor the reservoir, wherein the processor device controls at least one of the following based on data detected by the one or more sensors: dispensing the de-icing fluid from the first applicator device; dispensing the de-icing compound from the second applicator device; and dispensing the de-icing compound from the tank into the reservoir using the dispensing device.

In another aspect, there is provided a method for capturing and recycling de-icing fluid with an integrated ground system, the method comprising: at least one of receiving the de-icing fluid or forming the de-icing fluid at a permeable ground surface; the de-icing fluid permeating down through the permeable ground surface; capturing the de-icing fluid with an impermeable liner located below the permeable ground surface; collecting the captured de-icing fluid in a reservoir; and dispensing the captured de-icing fluid from the reservoir.

In an example aspect, a pavement system for collecting salt brine runoff is provided. The system includes one or more liquid permeable pavement layers and an impermeable liner that collects the salt brine below the pavement. The brine is collected below the surface into a storage reservoir.

In another aspect, a system capable of applying the recycled salt brine to a paving surface is provided, the system comprising components for obtaining recycled salt brine and dispensing the recycled salt brine to de-ice a ground surface.

In yet another aspect, an integrated pavement system comprising a sensor(s) and a processor to control the collection and management of the collected salt brine.

It will be appreciated that the aspects and features described in this summary section are non-limiting and that additional features and embodiments are provided in the description and the drawings.

IV. BRIEF DESCRIPTION OF THE DRAWINGS

Embodiments will now be described by way of example only with reference to the appended drawings wherein:

FIGS. 1a and 1b are a series of cross-sectional side views of a paving system for collecting salt brine according to an example embodiment;

FIGS. 5a and 5b are a series of cross-sectional side views of another paving system for collecting salt brine with a multitude of piping layers according to another example embodiment;

V. DETAILED DESCRIPTION

Figure 2A:
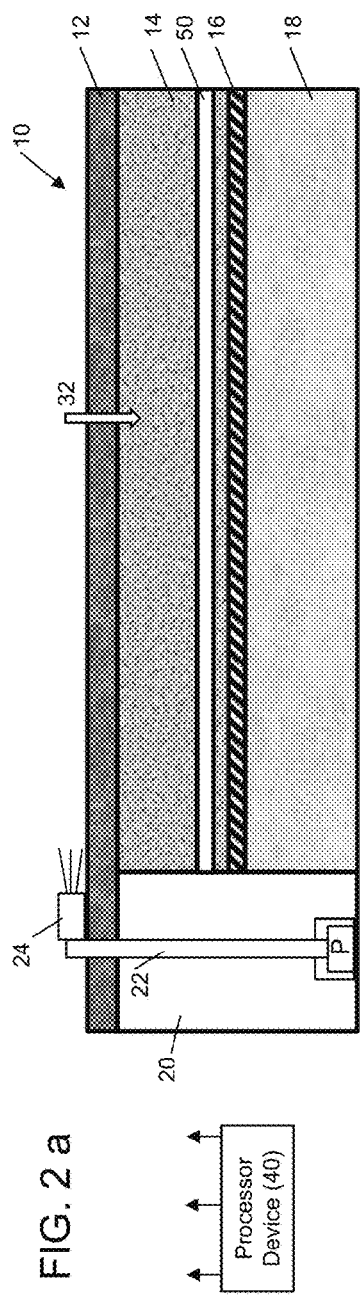
FIGS. 2a-2c are a series of cross sectional side views of another paving system for collecting salt brine with a piping layer according to another example embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

The present invention provides an integrated pavement system for collecting and recycling de-icing fluid. The term "de-icing fluid" herein refers to a liquid solution that includes a de-icing compound. Non-limiting examples of de-icing compounds include rock salt, salts, chlorides, acetates, "ice melter" compounds, natural compounds, and other compounds that are used to lower the freezing point of water. Thus, one example of a de-icing fluid is brine (i.e. a salt solution). For convenience, the term "de-icing brine" will be used in the present description. It will be understood that the use of such term is not intended to limit the scope of the description in any way. Thus, where the term "de-icing brine" is used, it will be understood that any type of de-icing fluid is intended.

It will be appreciated that many of the examples refer to salt or road salt, but other types of de-icing compounds are applicable. Similarly, it will also be appreciated that while many of the examples refer to salt brine, other de-icing brines that include a different de-icing compound are applicable.

The proposed system enables capturing and collecting de-icing brine that has run off a ground surface into a container, and then re-applying the collected de-icing brine on to the ground surface for de-icing purposes. In this way, the de-icing brine that is used on the ground surface is collected and re-used.

From another perspective, the de-icing compounds (e.g. a salt or other solid) are recycled using the proposed system. In particular, the de-icing compounds mix with the water, snow or ice on the ground to produce a de-icing brine on the ground. This resulting de-icing brine, which is typically waste, is then captured, collected and re-applied onto the ground surface.

In another example aspect, the collected de-icing brine is transported offsite. In another example aspect, the collected de-icing brine is drained into the sewage or into the environment (e.g. the subsoil).

Paving systems may, for example, be used in areas of high traffic. Areas of high traffic may be associated with areas of higher concentration of road salt. For example, roads for vehicular traffic are commonly subject to higher application rates of road salt to improve the safety of travelers.

Permeable pavements may allow for liquid drainage. Liquid draining through a permeable paving system may comprise salt brine. For example, precipitation may dissolve the road salt and carry it through a paving system and into nearby groundwater. It is desirable to reduce the concentration or quantity of salt, or both, that enters the environment. Furthermore, it is desirable to capture salt brine for possible re-application on a surface.

The paving system comprises one or more layers. The paving system may further comprise one or more impermeable liners, one or more piping layers, one or more flow control valves or any combination thereof. The paving system further comprises one or more reservoirs below the surface for storing the salt brine captured by the impermeable liner. The paving system further comprises one or more pumps for transporting the salt brine from the reservoir to the surface for reapplication or transport offsite.

A brine storage reservoir may be any load bearing structure that defines a void for liquid storage. A prefabricated reservoir may be used, or the reservoir may be constructed onsite. The reservoir may be constructed from any number of suitable materials that are impermeable to liquid including, but not limited to, concrete, plastic, polymer composite, metal, or any combination thereof.

A reservoir may have an inlet for allowing liquid to enter. Many variations to the configuration, composition and location of the inlet are applicable to the system described herein. For example, a portion of the reservoir, located near the top, includes one or more apertures. The apertures, for example, are perforations and are covered with a permeable membrane. A non-limiting example of a permeable membrane is a geotextile. In another embodiment, the inlet to the reservoir may be a hole, located near the top of the reservoir structure (e.g. positioned near the top of a side wall of the reservoir). The hole may, for example, be covered with a mesh, wire or otherwise, that limits the size of solid particles permitted to enter the reservoir. In another embodiment, the inlet protrudes from the main structure of the reservoir, and into the aggregate layer. For example, the inlet may take the form of a funnel or tray which permits liquid to enter but substantially limits the ingression of solid particulates (e.g. dirt, crushed rock, or other aggregate material). As described later, the inlet may allow for one or more piping layers to enter the reservoir.

In an example embodiment, one or more pumps are used to transport the liquid (e.g. the de-icing brine) from the reservoir, through a conduit, and up towards the surface. In an example aspect, one or more of the pumps are located below the ground surface. In an example embodiment, the one or more pumps are located within the reservoir. In another example embodiment, the one or more pumps are located outside the reservoir and in a pump housing unit.

In an example embodiment, the integrated paving system includes a permeable ground surface (e.g. permeable paving stone system, permeable interlocking concrete paving stones, permeable concrete, permeable asphalt, etc.) that allows the de-icing brine to flow downwards below the ground surface. The de-icing brine is captured in a catchment area. The catchment area includes porous aggregate (e.g. crushed rock or other material) and an impermeable liner on its bottom, so that the de-icing brine is collected above the impermeable liner. The de-icing brine in the catchment area flows into the reservoir, from which it may then be re-applied onto the same permeable ground surface or to another ground surface.

In another example embodiment, the integrated paving system includes one or more piping layers to reduce overflow of the paving system when a substantial amount of liquid is present and to efficiently transport the liquid to the reservoir. In a preferred example embodiment, the one or more piping layers are disposed below the upper surface of the paving system (e.g. the ground surface) and above an impermeable liner. The piping layer enables liquid to flow out of the catchment area defined above the impermeable liner. When liquid building up above the impermeable liner reaches the level of the piping layer, the liquid flows into the piping layer where it is then diverted to the reservoir.

The paving system may further include one or more valve mechanisms. A valve mechanism is used, for example, as an overflow relief mechanism that controls the flow of the liquid out of the paving system. In another aspect, a valve mechanism is coupled to any one or more of the piping layers to control the flow of liquid out of the paving system through the piping layers. In another aspect, a valve mechanism is coupled to any one or more of the reservoirs to control the flow of liquid out of the reservoir.

In one aspect, the impermeable liner may be formed from an impermeable sheet or other materials that can stop or at least substantially reduce the flow of a liquid. The impermeable liner may extend upwardly on the sides of the paving system to create a catchment area, also herein called a containment area. Preferably, the containment area prevents or reduces the de-icing brine from draining out of the paving system, so that the de-icing brine that permeates downwards into the containment area is captured and diverted into the reservoir.

As outlined above, the impermeable liner may include one or more substantially impermeable layers. Each layer may include one or more membranes, which prevent or reduce the flow of liquids therethrough. Membrane layers preferably comprise a continuous membrane film. Membrane layers may alternatively comprise a horizontally laid grid of membrane elements which preferably overlap or are sealed to one another to reduce or eliminate leakage of liquid therebetween.

An impermeable liner may extend to each edge of the paving system to have an area substantially equal to the surface area of the paving system. The impermeable liner may be disposed beneath and substantially parallel to the surface layer of the paving system. An impermeable liner may alternatively extend beyond the edges of the paving system and upwards towards the pavement layer (e.g. the ground surface), forming a containment area around at least some of the layers of the paving system, to substantially reduce flow out of the paving system laterally.

In another aspect the impermeable liner may be disposed at a slight angle from the pavement layer allowing for the liquids to flow in the direction of the one or more reservoirs.

In another aspect, the paving system may comprise a piping layer comprising one or more pipes operable to receive liquids flowing in the paving system and divert such liquids to one or more of the reservoirs.

The piping layer may be disposed substantially horizontally or at a slight angle from the surface. The piping layer may be disposed at a predetermined distance from the upper surface of the paving system or a predetermined distance of the lower surface of the paving system.

The piping layer may alternatively be disposed substantially vertically or at any other angle or combination of angles (e.g., the piping layer may be a three-dimensional grid formed from pipes angled relative to each other).

In an example embodiment, a paving system includes a permeable ground surface with a containing area positioned below. The containing area includes a piping layer and an impermeable liner. The impermeable liner is positioned beneath the piping layer. In this implementation, liquid (e.g. de-icing brine) falls downwards through the permeable ground surface, past the piping layer, and collects above the impermeable liner. The liquid collects in the containing area and its level rises up in the containing area as more liquid is collected. When the liquid level in the containing area reaches the level of the piping layer, the liquid enters into the piping layer, where it is then transported to the reservoir for storage.

The pipe or pipes in the piping layer includes one or more apertures, which enable liquid to enter into the piping layer. The apertures are, for example, perforations. The apertures may be positioned in various locations along the piping layer. For example, the apertures may be disposed uniformly along at least one of the upper side, the lower side and the lateral sides of a pipe, or any combination thereof. It will be appreciated that the apertures may be disposed about the piping layer in other arrangements.

For example, a horizontally disposed spaced apart piping layer may comprise one or more apertures on its lower side. Liquid flowing from above the piping layer generally flows past the piping layer since there are no apertures on its upper side. When liquid builds up to the piping layer, it may ingress the piping layer on its lower side and flow to the reservoir.

In another example, a horizontally disposed spaced apart piping layer may comprise one or more apertures on its upper side. Liquid flowing from above the piping layer generally flows past the piping layer since they are spaced apart. Only a minority of the liquid flows into the piping layer at this time. When liquid builds up to the piping layer, it may ingress the piping layer on its upper side and flow to the reservoir.

In another example, a horizontally disposed substantially continuous piping layer may comprise apertures on its upper and lower sides. Liquid flowing from above the piping layer generally flows through the piping layer via the apertures. When liquid builds up to the piping layer, it may ingress the piping layer on its lower side and flow to the reservoir.

In another example, a vertically disposed piping layer may comprise one or more apertures on its sides or at an end thereof. When liquid builds up to the apertures, it may it may ingress the piping layer and flow to the reservoir.

The apertures may be substantially covered with a liquid permeable membrane. For example, the piping layers may be covered in a geotextile which allows for liquid permeation but limits the ingress of solid particulate from the aggregate layer to the piping layer.

The piping layer may comprise pipes of various materials including steel, concrete, polymer, and composites. The pipes in the piping layer may be laid out substantially horizontally. The pipes may comprise an opening at least at one end thereof at a predetermined distance from the impermeable liner and/or from the surface and/or from any particular layer. The opening may be disposed within or coupled to the reservoir. As liquid accumulates in the pipes, it may be directed by the pipes to the opening and begin to drain into reservoir.

Substantially horizontal pipes, which may nevertheless be disposed at a sufficient angle to provide drainage, may carry liquid to a nearby pipe or to the reservoir. The pipes in the piping layer may be also be substantially vertical, or may be disposed in other orientations.

In one embodiment, the paving elements are disposed in an arrangement that defines a perimeter. The aggregate layer may extend beyond any of the edges defined by the perimeter to receive liquid that may flow over or beyond the edges of any paving element disposed along the perimeter. In a paving system with a single paving element, for example, an asphalt-paved road, the paving element may be cambered to increase the flow of liquids off the surface of the pavement and over the lateral edges of the pavement. The aggregate layer may extend beyond these edges of the pavement such that any liquid flowing off the edges of the pavement flows into the aggregate layer. The impermeable liner may extend beyond the edges of the aggregate layer.

The paving system may include an overflow relief mechanism. The overflow relief mechanism may be in communication with one or more of the one or more piping layers. The overflow relief mechanism may comprise one or more overflow pipes comprising one or more overflow valves. Actuating the valves may enable the adjustment of the liquid level in the reservoir.

The paving system may include a variety of sensors that can measure various parameters to enable automation of, or monitoring of, or both, various aspects of the paving system. In one embodiment the paving system includes a liquid level sensor that can determine the amount of liquid in the reservoir. In another embodiment, the paving system includes a temperature sensor, disposed on or near the surface so as to measure the environmental temperature above-ground. In another embodiment, the paving system may comprise a sensor that can determine the concentration of de-icing compound in the liquid stored in the reservoir. Such a sensor may be a salinity sensor, known in the art, which may measure the concentration of salt in the liquid. Other types of currently known and future-known sensors that can detect the concentration of de-icing compound in the de-icing brine are applicable to the principles described herein. These examples are not meant to limit the number or type of sensors employed by the system. Any number or type of sensors may be incorporated into the integrated pavement system. For example, the system may include at least one of a temperature sensor, a concentration sensor, a volume level sensor, a moisture sensor, a humidity sensor, a Near Field Communication (NFC) reader/receiver, a Radio Frequency Identification (RFID) reader/receiver, and a proximity sensor, or another type of sensor. These one or more sensors may be disposed at any location within or at the surface of the integrated pavement system.

In one aspect, the overflow valve may be controlled automatically based on data collected by a volume level sensor. In one embodiment, a user may set a threshold reservoir liquid level. Once the volume level sensor measures a volume level above said threshold, the overflow valve is opened, releasing liquid from the reservoir to the sub-soil.

In one aspect, the overflow valve may be controlled automatically based on data collected by the reservoir de-icing compound concentration sensor. In one embodiment, a user may set a threshold de-icing compound concentration. Once the concentration sensor measures a de-icing compound concentration below said threshold, the overflow valve is opened, releasing liquid from the reservoir to the sub-soil.

The de-icing compound may be applied to components or layers in various forms, for example, powder form, dry particulate form, in monolithic form, etc. Additionally, the particle size of the de-icing compound may vary from nanoparticle sizes to large monoliths. The de-icing compound may also be in liquid form. A particulate de-icing compound may be suspended in a liquid to form a de-icing compound medium such as a suspension, a solution, or a liquid-suspended particulate. The de-icing compound medium may include a surfactant to prevent agglomeration of the de-icing compound.

A de-icing compound medium may be applied to a paving system as a liquid, for example, in the form of a spray. In an example embodiment of a paving system, the spray may be applied to the ground surface layer of the paving system. The de-icing compound medium permeates through the permeable ground surface of the paving system. The de-icing compound may be diluted by other liquids in the environment such as snow melt, ice melt, rainwater, other water sources, or a combination thereof. After permeating through the pavement layer, the de-icing brine drains through the aggregate layer and flows into the reservoir.

Referring to FIG. 1a, an integrated ground surface system 10 for collecting and recycling de-icing brine is shown. The integrated ground surface system 10 includes a permeable ground surface layer 12 (e.g. permeable pavement or other permeable ground surface material) that forms an exposed upper surface. The system 10 further includes a liquid permeable porous aggregate 14 disposed below the permeable ground surface layer 12, and which may support the ground surface layer 12. The system 10 further includes an impermeable liner 16 disposed beneath the porous aggregate 14. The aggregate layer 14 may include one or more particle sizes. For example, the aggregate layer 14 may comprise one or more of gravel, crushed stone and pebbles. The aggregate layer 14 may alternatively comprise particles of substantially uniform size.

The upper surface of the ground surface layer 12 may be exposed to snow, rain, ice, etc. 26, which may come from precipitation 28. To improve traction on the upper surface, a de-icing compound, such as road salt or salt brine, is applied to the surface. This de-icing compound may mix with the snow or ice 26 and form a mixture 30 of de-icing compound and melted snow or ice, also called de-icing brine. This de-icing brine formed from the mixture 30 permeates down through the pavement layer 12 as shown by arrow 32. The brine passes through the porous aggregate layer 14 until it reaches the impermeable liner 16. The de-icing brine B sits or collects on top of the liner 16. The liner 16 forms a containment area and directs the flow of brine to the reservoir 20, as represented by the arrow 34. FIG. 1*b* shows an alternative embodiment where the liner 16 is positioned at an angle to the ground surface layer 12 so as to direct the flow of brine in the direction of the reservoir 20.

The brine B is shown collected in the reservoir 20, and a pump P directs the de-icing brine B up through a pipe 22 (e.g. see arrow 36), and out through a de-icing applicator 24 (e.g. see arrow 38). In other words, the de-icing brine is reused or recycled as it is re-applied onto the ground surface 12.

The system 10 includes, for example, a processor device 40 that is in communication with the pump P, amongst other potential components. The processor device is used to control the pump P. The processor device may also control the de-icing brine applicator device 24.

It will be appreciated that the permeable ground surface 12 is interchangeably herein referred to as a permeable pavement surface 12. In a preferred embodiment, the permeable ground surface is a permeable pavement surface. However, the permeable ground surface is not limited to permeable pavement surfaces, and can include other ground surface materials like wood, plastic, rubber, and metal.

Figure 2B:
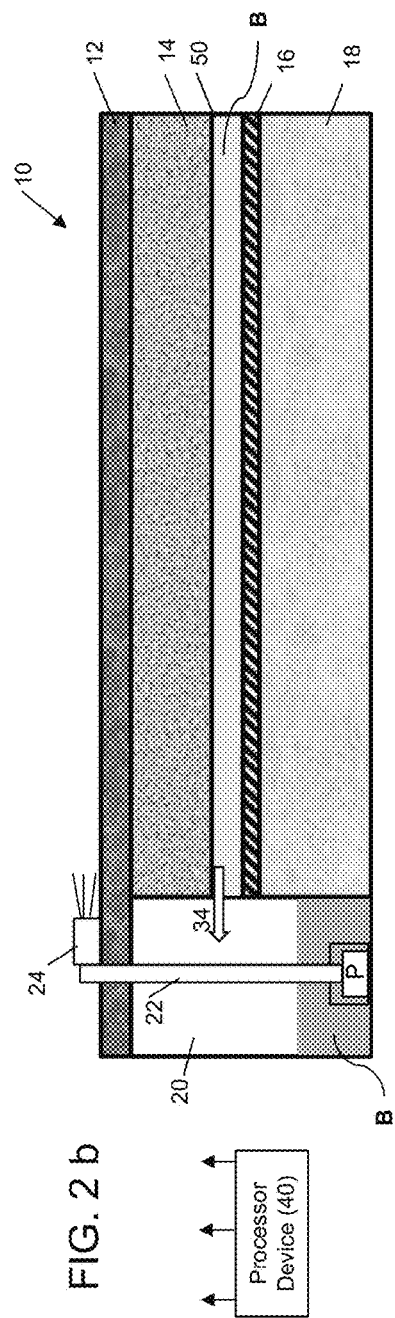

Turning to FIG. 2*a*, another example embodiment of an integrated system 10 is provided. The system in FIG. 2*a* includes a piping layer 50 that is positioned in the aggregate layer 14, below the ground surface layer 12 and above the liner 16. The piping layer 50 is yet another way to direct the flow of brine from the catchment area above the liner 16 to the reservoir 20. As described above, the piping layer 50 may be formed in such a way so that the brine flowing from above the piping layer 50 generally flows down past the piping layer 50. As shown in FIG. 2*b* the brine level B may build up to the piping layer 50, where it may ingress the piping layer, via apertures in the pipes of the piping layer, and flow to the reservoir 20 as demonstrated by arrow 34.

Figure 2C:
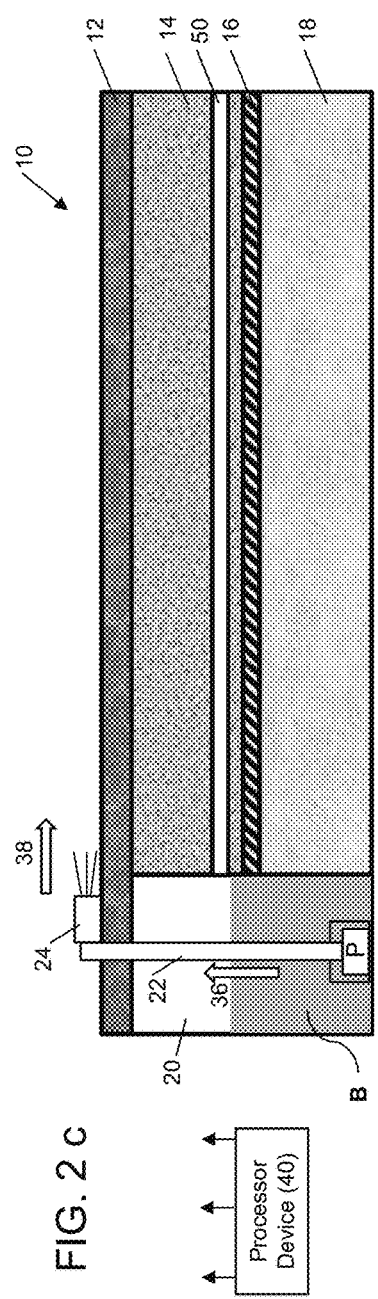

As shown in FIG. 2*c*, once the brine B reaches the reservoir, a pump P may pump the brine B to the surface via a conduit 22 as demonstrated by arrow 36. Once pumped to the surface, the brine B may be applied to the surface of the pavement layer 12 via a de-icing applicator device 24 as demonstrated by arrow 38.

In an example embodiment, the de-icing applicator is positioned on or near the ground surface. In an example embodiment, the de-icing applicator is stationary or in a fixed position. In an example embodiment, the de-icing applicator is supported on a structure above the ground. In an example embodiment, the de-icing applicator is configured to spray or dispense the de-icing brine.

Figure 3:
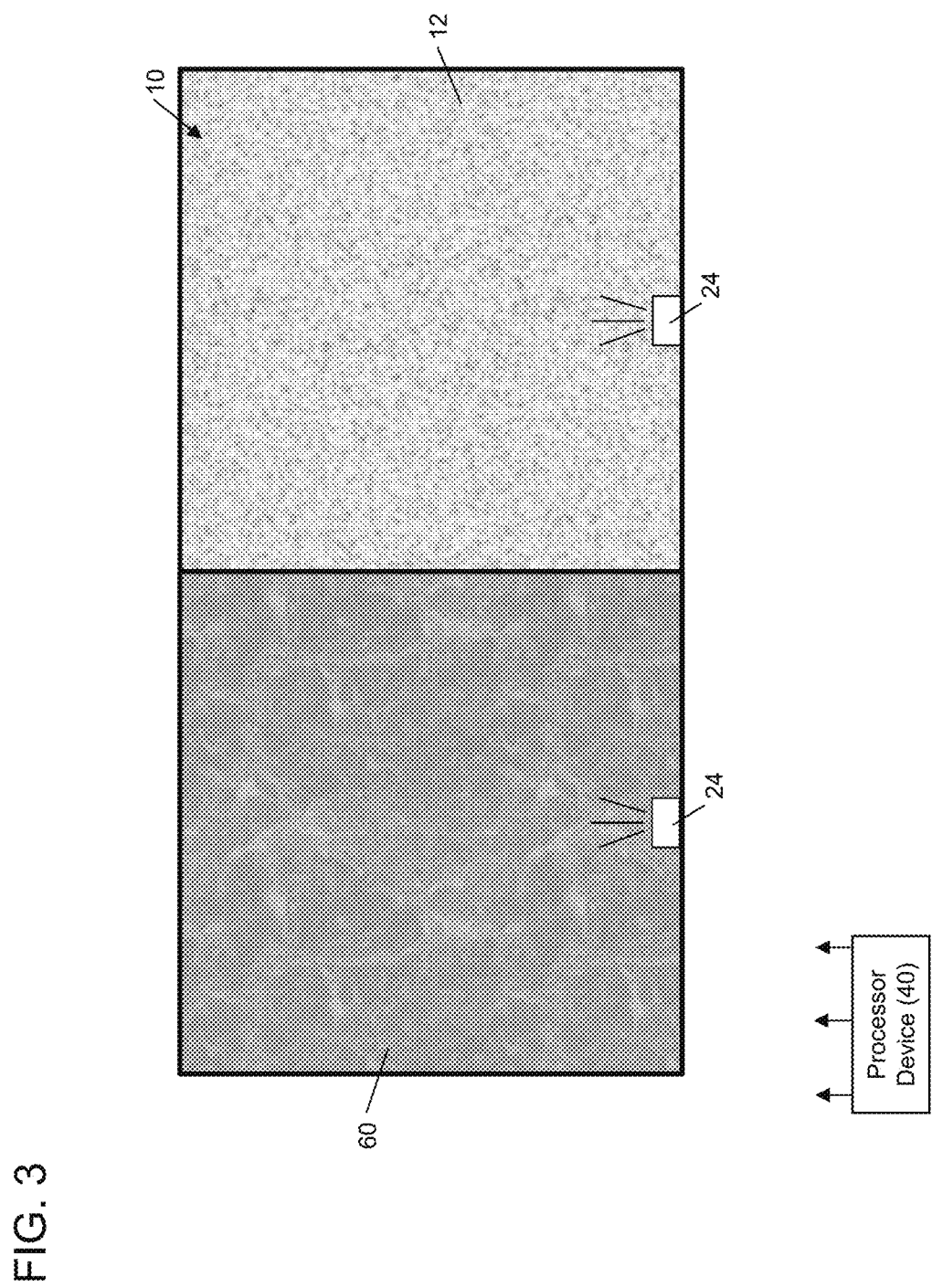
FIG. 3 is a top view of a paving system with an impermeable pavement and liquid permeable pavement in close proximity to each other according to another example embodiment.

FIG. 3 shows that the de-icing brine collected by the integrated ground surface system 10 may be applied to a impermeable pavement surface 60 via a de-icing applicator 24. For example, a surface area includes the impermeable or typical pavement surface 60 that is adjacent to, or nearby, the permeable ground surface 12. The runoff from the impermeable pavement surface 60 may be directed towards the permeable pavement surface 12, so that the de-icing brine may be collected and recycled by the system 10. The collected de-icing brine is re-applied to the surfaces 60 and 12 using multiple de-icing applicators 24.

Figure 4:
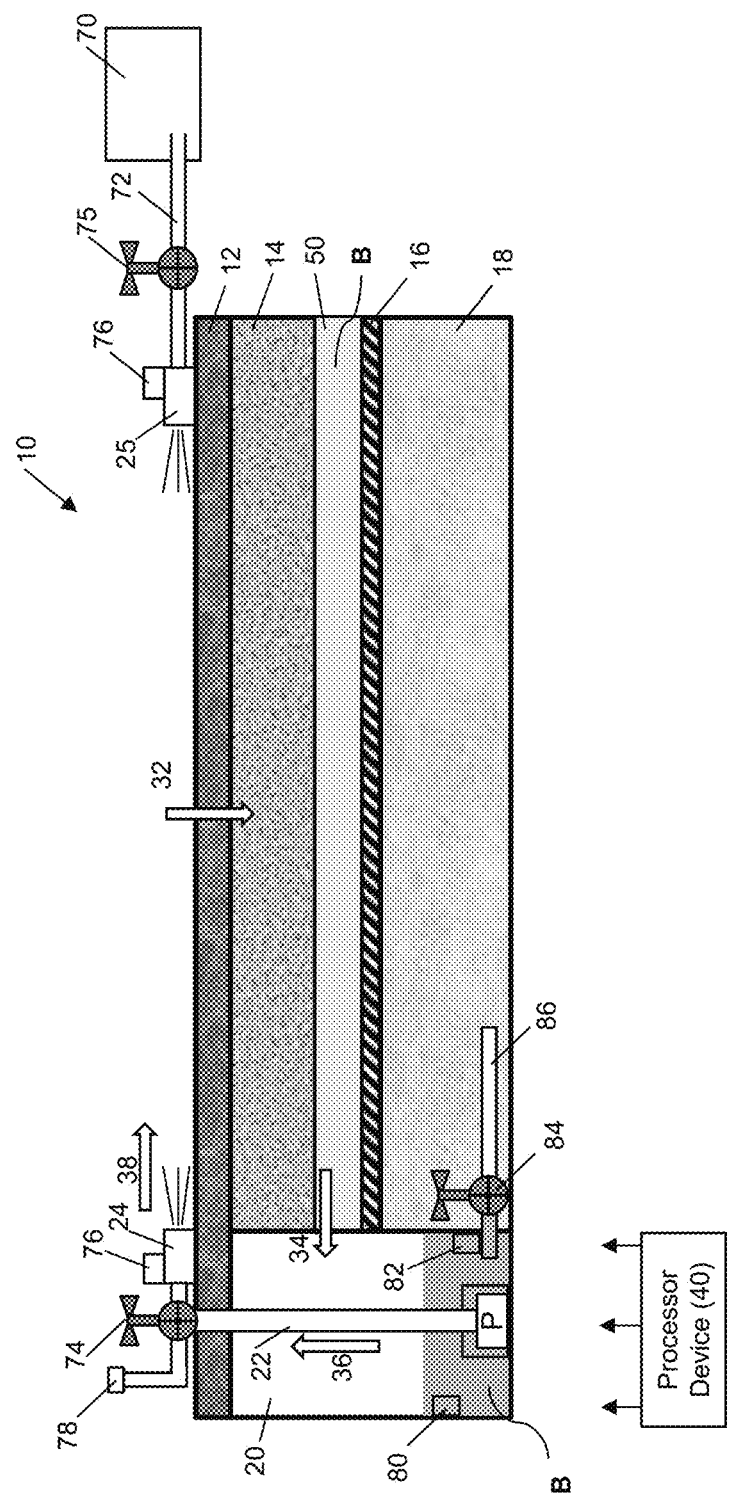
FIG. 4 is a cross-sectional side view of a pavement system for collecting salt brine that includes an overflow release mechanism and an additional de-icing applicator according to another example embodiment.

FIG. 4 shows yet another embodiment of the integrated ground surface system 10. The system 10 further includes a de-icing compound storage tank 70 that holds de-icing compound to be applied to the surface of the permeable pavement layer 12. The de-icing compound may be in a solid form or a liquid form. A storage tank supply conduit 72 connects the storage tank 70 to the de-icing applicator device 25, which is configured to dispense the de-icing compound over the ground surface. For example, a processor device 40 may determine and control whether to apply de-icing brine from the reservoir 20 or to apply de-icing compound from the storage tank 70, or both. The applicator device 25 may include mechanisms to dispense the de-icing compound in the solid form, or may include a nozzle system to spray the de-icing compound in the liquid form.

In an example embodiment, a valve or other mechanism 75 is used to stop or enable the movement of de-icing compound through the conduit 72. The processor device 40 may controllably actuate the valve 75 to control the output of the de-icing compound.

In an example process that is used with the embodiment in FIG. 4, the processor device activates the applicator 25 to dispense the de-icing compound on to the ground surface. The de-icing compound may mix with water, snow, or ice, to form a de-icing brine mixture, which permeates through the ground surface 12, and is collected into the reservoir 20. In this way, the de-icing concentration of the brine in the reservoir can be purposely increased. In other words, the de-icing compound is released from the storage tank 70 in order to increase the de-icing concentration in the brine in the reservoir 20. With an increased de-icing concentration, the de-icing brine that is outputted from the applicator 24 will be more effective in lowering the freezing temperature of the snow, water, ice, or any combination thereof, on the ground surface.

In another example, although not shown in the figures, the storage tank 70 may be positioned underground. In an example embodiment, storage tank 70 releases de-icing compound directly into the reservoir 20 to increase the de-icing concentration of the brine in the reservoir 20. This more concentrated brine may then be applied to the surface of the pavement surface 12.

Referring back to FIG. 4, sensors are incorporated into the paving system 10. This example is not meant to limit the number or type of sensors employed by the paving system 10.

One or more temperature sensors 76 are included in the system 10 to measure the temperature at the surface of the pavement layer 12. In another embodiment, a concentration sensor 80 is located within the reservoir 20 to measure the concentration of de-icing compound in the brine. In yet another embodiment, a volume level sensor 82 is positioned within the reservoir 20 to measure the volume of liquid in the reservoir 20. Other sensors may be incorporated into the paving system 10. The sensors may communicate with the processor device 40.

FIG. 4 also shows a valve release mechanism 84. The processor device 40 may controllably actuate the valve 84 to allow for brine from the reservoir 20 to be released to the sub-soil 18 via a pipe 86. In another embodiment the processor device 40 may controllably actuate the valve 84 to allow for brine from the reservoir 20 to be released to a sewer system (such as a storm drain) via the pipe 86. Although not shown, in an example embodiment, the pipe 86 leads to the sewer system. While it is not shown in the figure, various systems are contemplated for directing the liquid away from the pavement system which may incorporate one or more pumps, pipes, or both, for displacing the liquid. In another embodiment, the valve 84 may be manually actuated and a control mechanism for the valve 84 is positioned above the ground surface.

As shown in FIG. 4, an applicator valve 74 may be connected to an outlet 78. The applicator valve may be actuated manually or automatically such that it controls the flow of brine from the conduit 22 to the outlet 78 or the applicator 24. In an example embodiment, the de-icing brine is outputted from the outlet 78 and transported to a transport carrier (e.g. a tanker truck) or piped out to some other destination.

FIG. 5a demonstrates another embodiment with a plurality of piping layers disposed in the aggregate layer 14 between the pavement layer 12 and the impermeable liner 16. FIG. 5a shows a bottom-most piping layer 52 disposed in the aggregate layer 14 between another piping layer 50 and the liner 16. FIG. 5b shows that the brine level B in the pavement system 10 may surpass the level of the bottom-most piping layer 52. Each piping layer only releases brine from the paving system 10 when the brine level has reached the piping layer; this can control the flow rate of brine to the reservoir 20.

Figure 6:
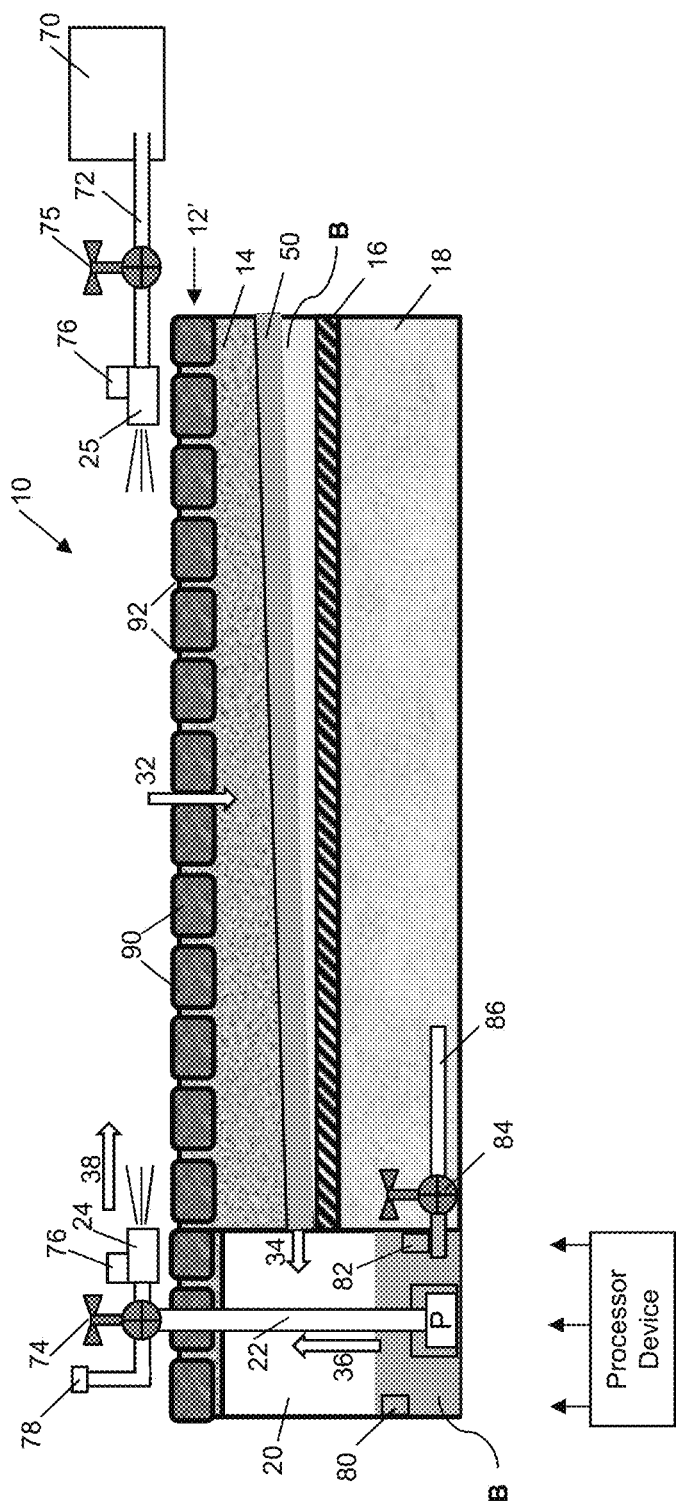
FIG. 6 is a cross-sectional side view of another paving system for collecting salt brine with an alternative pavement layer and with a piping layer that is at an angle with respect to the surface according to another example embodiment.

Referring to FIG. 6 another embodiment of the integrated ground surface system is shown. In this figure an alternative permeable pavement layer 12' is shown. The permeable pavement layer 12' includes paving stones, slabs or other paving elements 90 that allow for de-icing brine and other liquid to flow therethrough. When brine contacts the surface of the pavement layer 12', as shown by arrow 32, the brine permeates the filler material 92 in the interstices between the paving elements 90. The brine may permeate through the surface of the paving elements 90 and the filler material 92 into the porous aggregate layer 14. If the paving elements 90 are porous, brine may also flow into the aggregate layer 14 through paving elements 90. The brine then permeates through the aggregate layer 14 and arrives at the piping layer 50 which is shown at an angle, with a lower end of the pipe positioned at the reservoir 20. In this way, the brine flows down the angled pipe into the reservoir.

Figure 7:
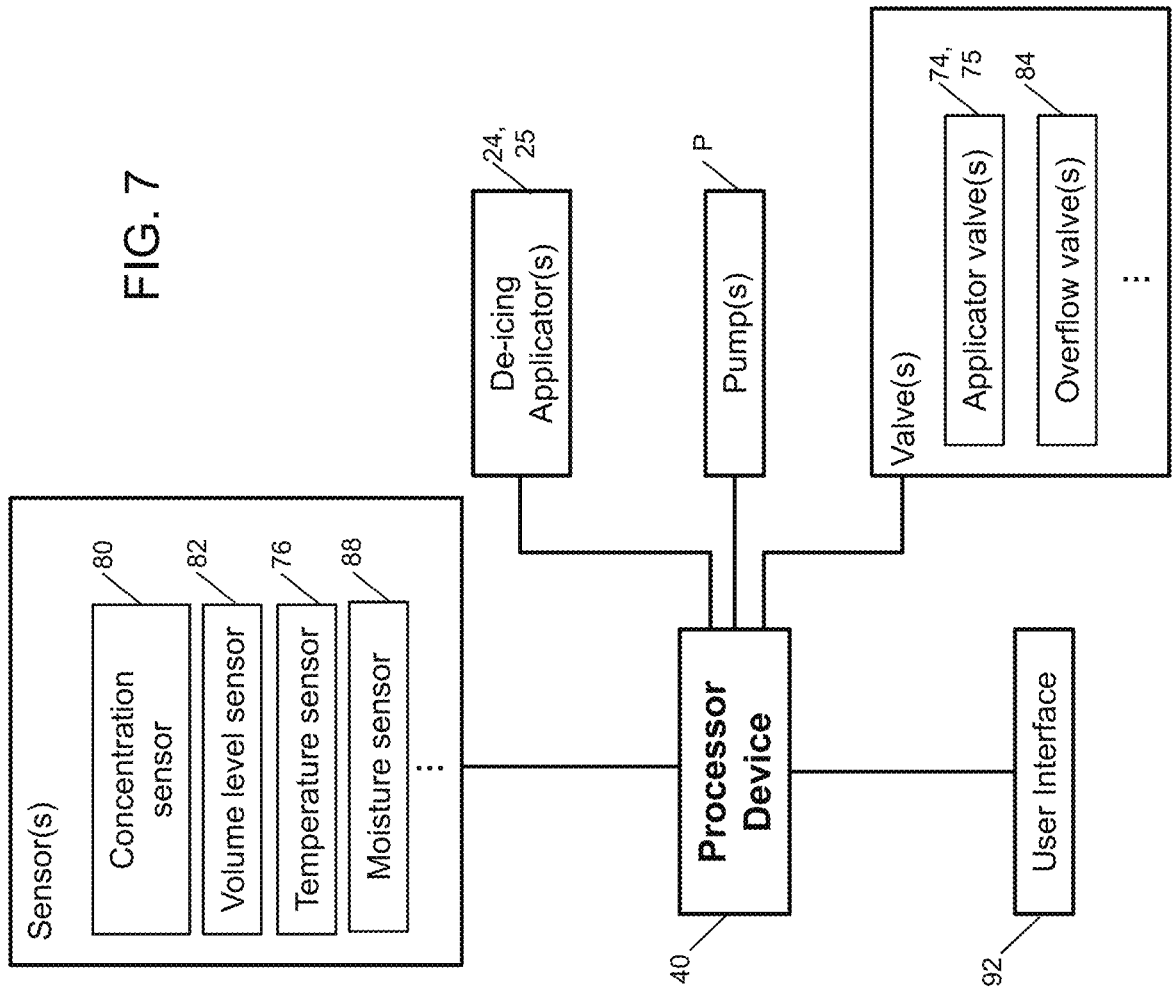
FIG. 7 is a system diagram showing components in a paving system according to another example embodiment.

Referring to FIG. 7, an example embodiment of the processor device 40 is shown in communication with various components. The processor device 40 executes processor executable instructions that are stored in memory. The processor device 40 may include hardware and software components. For example, the processor device 40 may include one or more processors, memory units, communication devices, programs or software applications, and databases. The processor device 40 may have a computer program installed within a memory device therein. The computer program may be any application software. The software may include the executable instructions for performing a single action or multiple, related actions or tasks.

The processor device 40 may include, or be in communication with, a user interface device 92 that allows a user to monitor the paving system, as well as input commands that control aspects of the paving system 10. The processor device 40 may communicate via wired connections to the various aspects, or in another embodiment the processor device 40 may communicate wirelessly with the various aspects.

Figure 9:
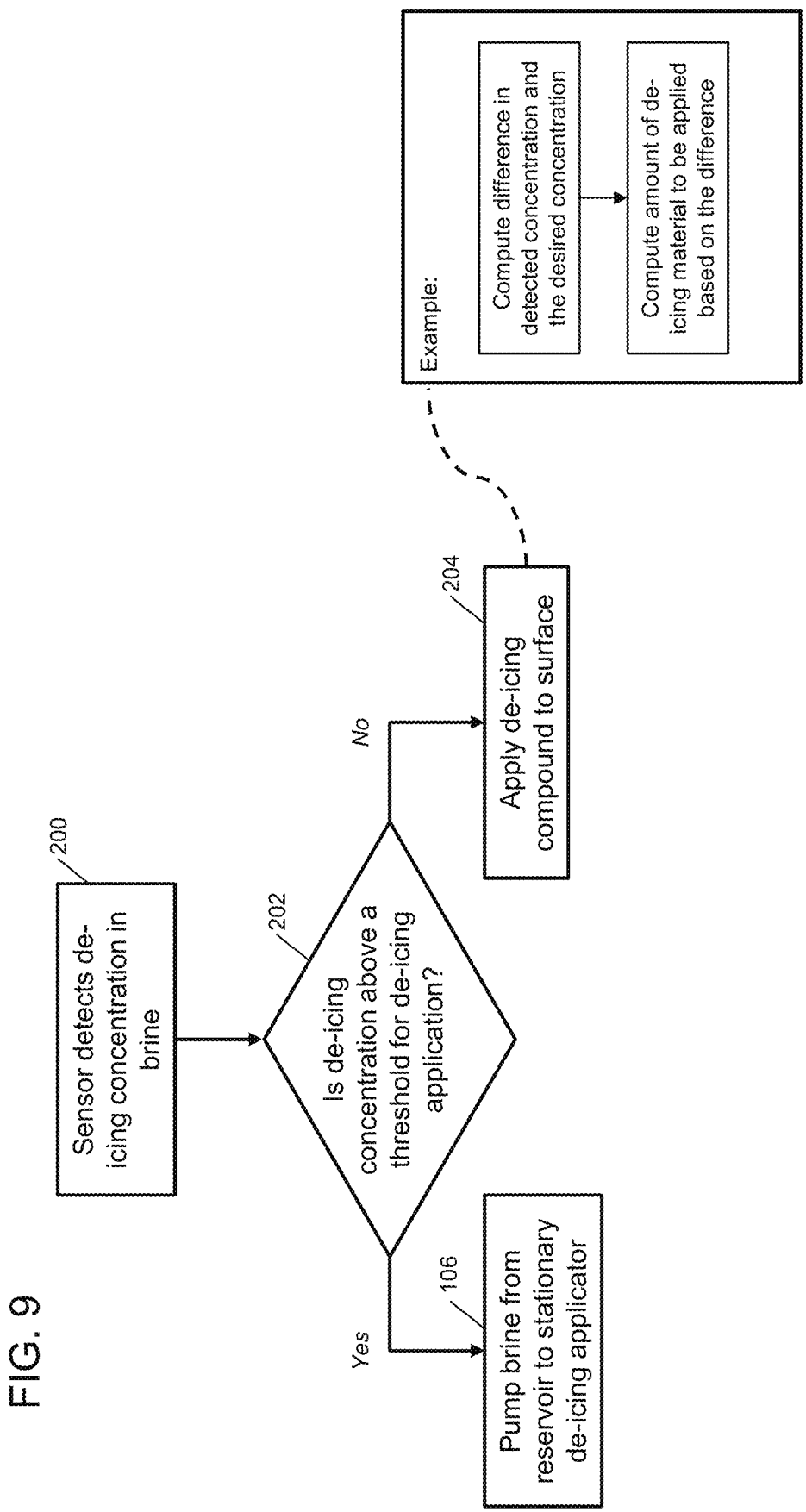
FIG. 9 is a flow diagram of processor executable instructions for a paving system to determining which de-icing solution to apply according to an example embodiment.
Figure 10:
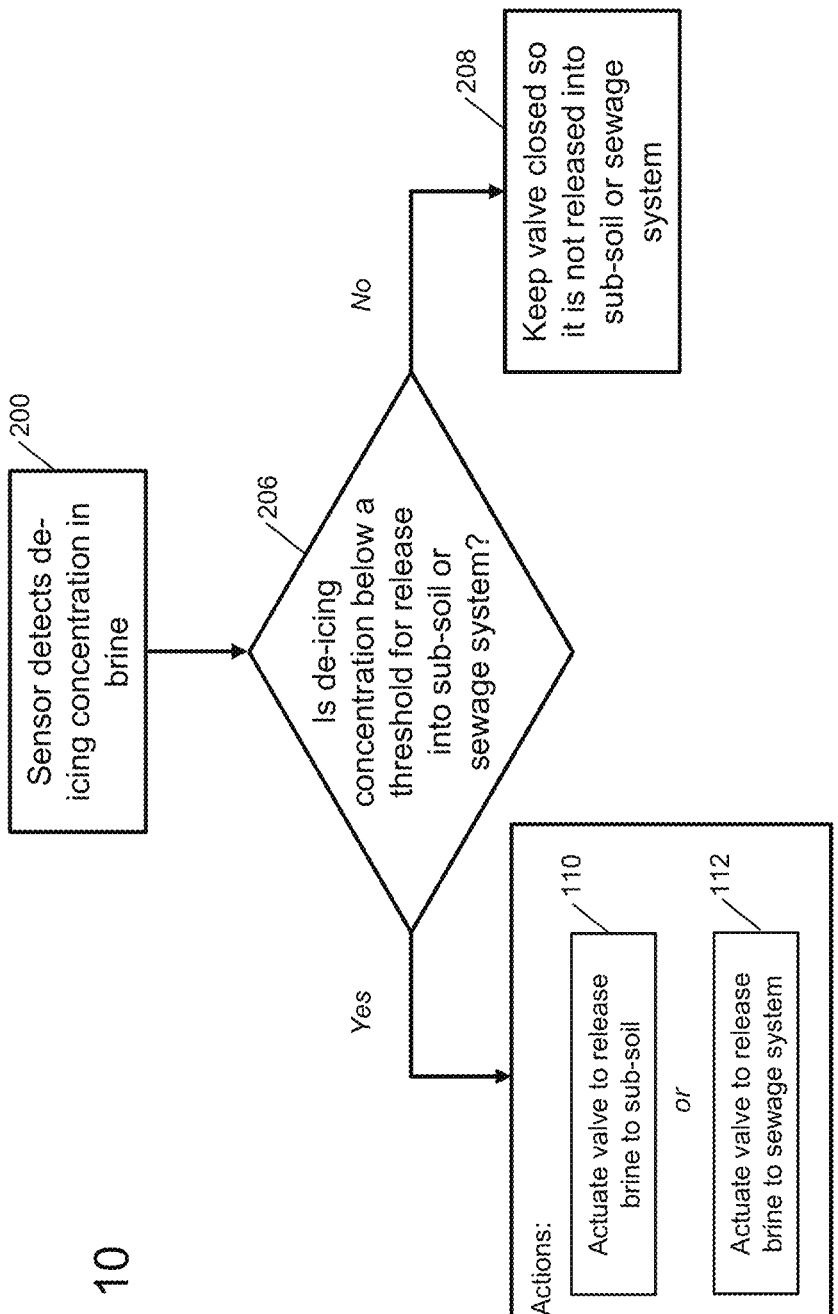
FIG. 10 is a flow diagram of processor executable instructions for a paving system to determine whether or not to release brine to the environment according to an example embodiment.
Figure 11:
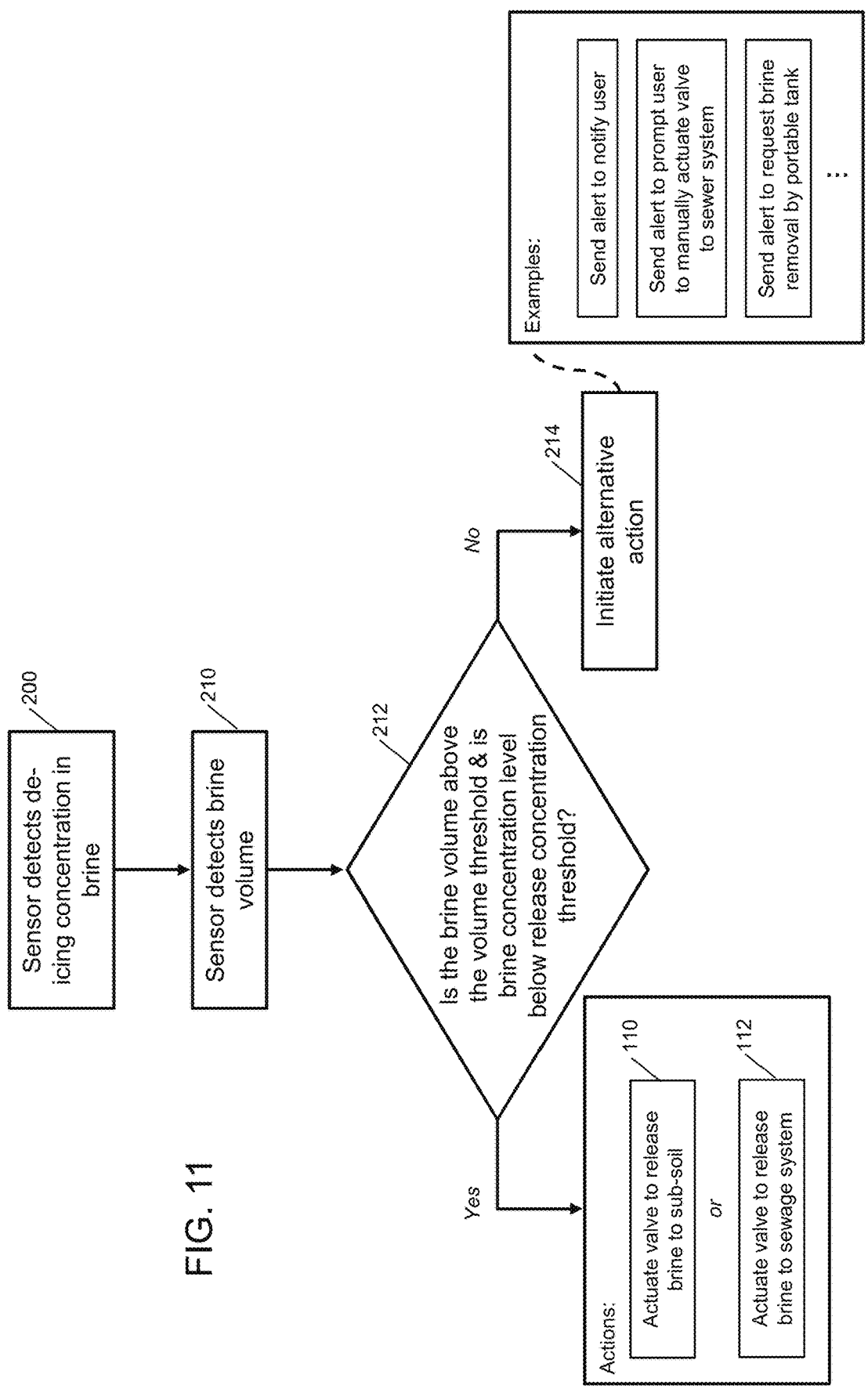
FIG. 11 is a flow diagram of processor executable instructions for a paving system to manage brine based on data acquired from sensors.

The processor device 40 may be used to process data captured by one or more sensors integrated into the paving system 10. For example, the processor device 40 may communicate with a concentration sensor 80 to determine the concentration of de-icing chemicals in the brine. FIGS. 9 to 11 show example executable instructions that depending on the data obtained from the sensors.

In an example embodiment, the processor device 40 communicates with the de-icing applicator(s) 24. In one embodiment, the processor device 40 receives data from a sensor that indicates the pavement layer 12 is coated with snow, ice, or both, or is cold enough for ice to form. The processor device 40 then commands the de-icing applicators to initiate the application of de-icing brine from the reservoir 20, or to initiate the application of de-icing compound from the tank 70, or both. In this way, the pavement layer will be treated with de-icing brine or de-icing compound, or both, which will improve the safety as people or vehicles traverse the pavement layer. In addition, or in the alternative, the processor device also communicates with one or more pumps P as part of applying the de-icing brine or de-icing compound, or both.

In another example embodiment, the processor device 40 receives data from a sensor that indicates that one or more reservoirs 20 have reached their maximum capacity. The processor device 40 may communicate with one or more pumps P to initiate the pumping of brine B from one or more reservoirs 20 to one or more outlets 78 for collection above the pavement layer 12. This may be useful for supplying the brine to a tanker truck for further transport. In yet another embodiment, the processor device 40 may communicate with one or more pumps P to initiate the pumping of brine B from one or more reservoirs 20 to one or more overflow pipes 86 for release into a sewage system or the subsoil.

The processor device 40 may be used to communicate with and control one or more valves. In one example embodiment, the processor device 40 may communicate with one or more overflow valves used to control the flow of de-icing brine or other liquid in the reservoir into the sewage or the subsoil. In an example embodiment, there is a separate valve that releases liquid from the reservoir into the subsoil 18, and a separate valve that releases liquid from the reservoir into the sewage system. In another example embodiment, a single valve selectively controls between a closed positioned, an open position to release liquid from the reservoir into the subsoil 18, and another open position to release liquid from the reservoir into a sewage system. In another example, the processor device 40 is configured to actuate one or more valves to a semi-open position where it would allow for various flow rates of liquid therethrough.

While communication between various individual components of the system 10 and the processor device 40 has been described above, it will be apparent to one skilled in the art that simultaneous communication between a plurality of aspects is within the scope of the present disclosure. For example, the processor device 40 may receive data from a sensor suggesting the surface of the pavement layer 12 is coated with snow and/or ice 26. The processor device 40 may communicate with one or more pumps P to pump brine from one or more reservoirs 20 to the surface via a conduit 22. The processor device 40 may simultaneously communicate with one or more of the applicator valves 74 to actuate the applicator valves 74 such that they permit the flow of brine B into one or more de-icing applicators 24. The processor device 40 may subsequently communicate with one or more of the de-icing applicators 24 to initiate the application of brine B onto the surface of the pavement layer 12.

In one embodiment, the processor device 40 incorporates a timer (not shown). For example, the processor device 40 could monitor the time between applications of de-icing compounds. It may be beneficial for the de-icing compounds to be applied at set times of day, or on regular intervals, or at time periods based on when the de-icing brine was last applied.

It will be apparent to one skilled in the art that while the processor device has been described extensively, the paving system 10 could alternatively function without it, an aspect within the scope of the present disclosure. For example, the ground surface system 10 could be fully manual. The valves 74, 75, and 84, the one or more pumps P, and the de-icing applicators 24 could all be controlled using mechanical devices or electromechanical devices (e.g. buttons and switches), and without a processor device.

Figure 8:
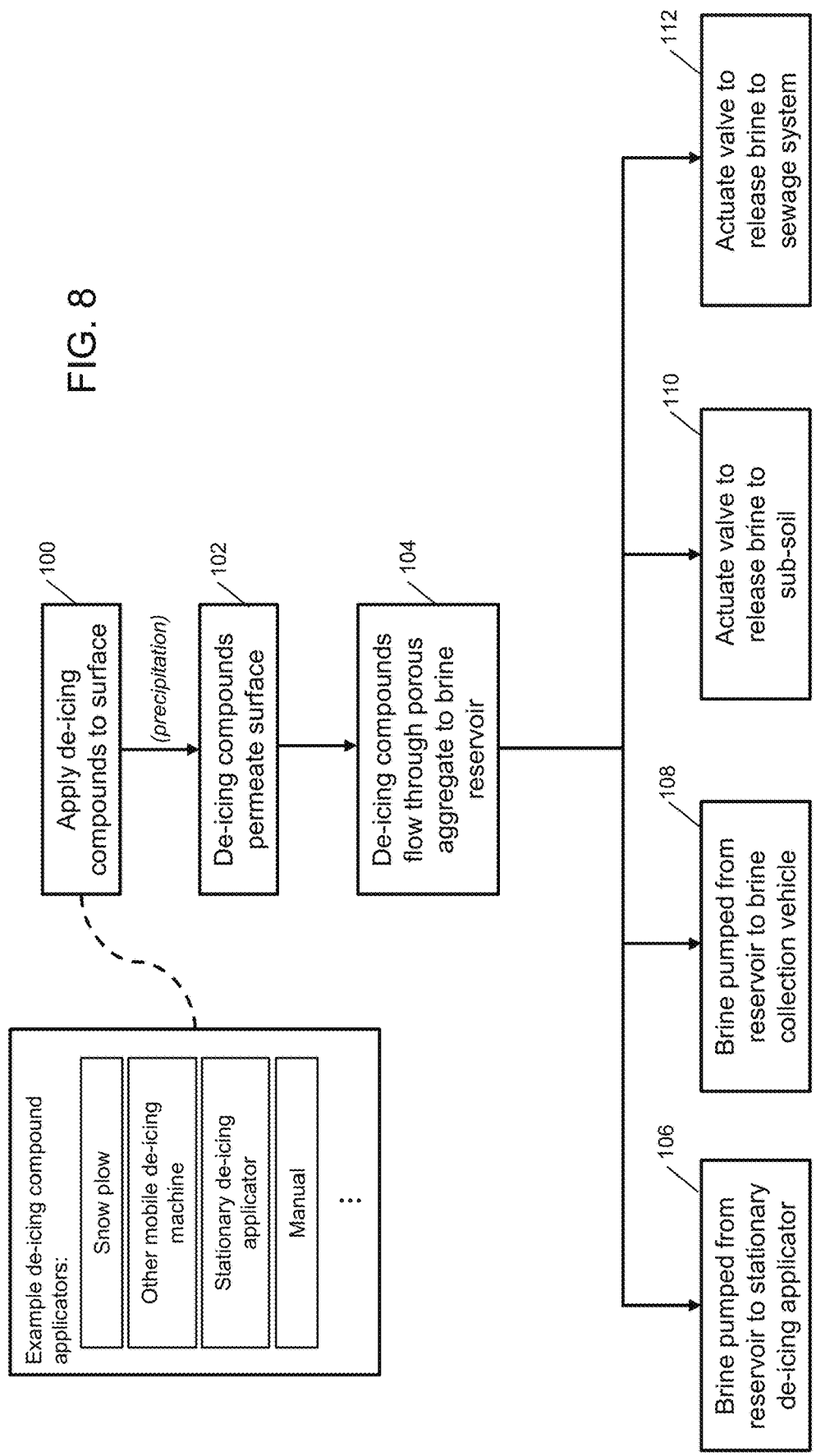
FIG. 8 is a flow diagram showing a process of de-icing brine through the pavement system according to an example embodiment.

Referring to FIG. 8, an example method for using the integrated ground surface system 10 to collect and recycle de-icing brine is shown. At block 100, de-icing compounds are applied to the surface of the pavement layer 12. This can occur in a variety of ways. For example, a snow plow may have an attachment that spreads road salt on a surface as it drives thereon. In another example, one or more stationary de-icing applicators 24 may spray a surface with a liquid de-icing compound. In another example, a person manually spreads or applies de-icing compound onto the ground surface. At block 102, the applied de-icing compounds permeate the permeable ground surface layer 12. The de-icing compounds may be diluted with precipitation such as rainwater or with liquid resulting from the mixture of snow and/or ice and the de-icing compound 30. At block 104, the de-icing compound, now a de-icing brine, flows through a porous aggregate layer 14 to one or more reservoirs 20.

After being collected in the reservoir 20 there are a variety of options for managing the de-icing brine B. At block 106, the brine B is pumped from the reservoir 20 to one or more stationary de-icing applicators 24 for de-icing a surface.

In another example, at block 108, the brine B is pumped from the reservoir 20 to a brine collection vehicle such as a tanker truck for transport offsite.

In another example, at block 110, one or more overflow valves 84 are actuated to release the brine B into the sub-soil 18.

In another example, at block 112, one or more overflow valves 84 are actuated to release the brine B into a sewage system such as a storm drain.

Referring to FIG. 9, an example embodiment of executable instructions is provided that use a sensor integrated with the system 10, as well as a de-icing compound applicator device 25 connected to a de-icing compound tank 70. At block 200, the processor device receives data from a sensor located in the reservoir, the sensor data indicating the concentration of de-icing compounds in brine B. At block 202, the processor device determines whether the de-icing compound concentration is above a threshold for use in de-icing a surface. In other words, the de-icing brine has a sufficient level of concentration to be effective to treat the ground surface. If it is above said threshold, the processor device initiates the process for the brine B to be pumped from one or more reservoirs 20 to one or more stationary de-icing applicators 24, as per block 106. If it is below the threshold, such that the concentration is ineffective for de-icing treatment, then the processor device activates the de-icing compound applicator device 25 connected to a de-icing compound tank 70 to apply the de-icing compound to the surface (block 204). It will be appreciated that the de-icing compound has a concentration that is effective for de-icing treatment of the ground surface. In an alternative implementation of block 204, the de-icing compound from the tank 70 is added directly to the de-icing brine in the reservoir 20.

In an example implementation of block 204, the processor device computes a difference between the detected concentration in the de-icing brine in the reservoir and a desired concentration for the de-icing brine that would be effective for treating the ground surface. After computing the difference in concentration, the processor device computes the amount of de-icing compound or material that should be applied to account for the difference in concentration. In other words, the processor devices computes the amount of de-icing compound from the tank 70 that would need to mix with the de-icing brine in the reservoir 20, in to order to produce a de-icing brine in the reservoir 20 that has a sufficiently high concentration to be effective in treating the ground surface.

Referring to FIG. 10, an example embodiment of executable instructions is provided that includes using a sensor integrated with the system 10. At block 200, the processor device receives data from a sensor that indicates the concentration of de-icing compounds in the brine B in the reservoir 20. At block 206, it is determined whether the de-icing compound concentration is below a threshold for release into the environment. In other words, the concentration of the de-icing brine is sufficiently low that is suitable to be released into the sub-soil or into the sewage system. If it is below the threshold, one or more valves 84 may be actuated to release the brine B to the sub-soil 18 (block 110), or one or more valves 84 may be actuated to release the brine B to a sewage system (block 112), or both. If it is above the threshold, the valve or valves 84 are kept closed so the brine B cannot be released into the sub-soil or sewage system (block 208). In this way, de-icing brine with a concentration that is considered harmful or unsuitable to the environment is prevented from being released into the environment.

Referring to FIG. 11, an example embodiment of executable instructions is provided that includes using various sensors integrated with the system 10. At block 200 a sensor detects the concentration of de-icing compounds in brine B. At block 210 another sensor detects the volume of brine B in a reservoir 20. At 212 it is determined whether the brine volume is above a volume threshold and whether the concentration of de-icing compound is below a concentration threshold for release into the environment. If both conditions are detected or satisfied, then the processor device activates one or more valves 84 to release the brine B into the sub-soil (block 110), or activates one or more valves 84 to release the brine B to a sewage system (block 112), or both.

If one or both of the conditions at block 112 are not met, then the processor device initiates an alternative action at block 214. For example, at block 214, the processor device could transmit an alert to notify a user that the requirements were not met. In another embodiment, the processor device sends a message or alert to request for the removal of brine by a tanker truck.

Other example aspects of the system include that, during the off-winter seasons when no de-icing brine is used or collected (or the concentration is low), water can bypass the storage via a valve or flow deflector system and drain into the sub-soil, or be used like a rainwater harvesting system.

In another example aspect, the de-icing brine can be used on the same permeable ground surface or on adjacent or other road and pavement surfaces.

In another example aspect, the de-icing brine is collected from an adjacent paved surface (road, parking, sidewalk) as contaminated run-off and collected within the reservoir to be reused.

In another example aspect, the system is configured to collect any surface run-on and direct it to the storage. For example, this may more likely happen in extended extreme cold weather when the brine may not percolate into the containment area and flow to the reservoir, but may accumulate on the surface.

In another example aspect, the system is configured so that, during the off-winter seasons when no de-icing compound is used, clear rainwater is collected or can bypass the storage and drain further into the ground via a valve system.

Using one or more of the features described herein, the system allows for much less de-icing material to be used, as the de-icing material can now constantly be reused and recycled. In another aspect, the system allows for de-icing of the surface in an automated manner by reusing the available brine from the subsurface storage reservoir with a spraying system. In another aspect, the de-icing brine can be created by applying rock salt or other de-icing material to the frozen surface and collecting the resulting brine at the bottom. In another aspect, the system allows for the de-icing brine to be reused on the same permeable ground surface, or transported and applied to treat a surface located elsewhere. In another aspect, when no de-icing is needed, such that there is little or no de-icing brine in the reservoir, then the rainwater that is harvested in the reservoir can be selectively reused or can be released to percolate into the lower regions of the soils, or both.

It will be appreciated that the processor device includes one or more computer readable mediums that may collectively store the computer executable instructions that, when executed by a processor device, perform the computations described herein.

It will be appreciated that different features of the example embodiments of the system and methods, as described herein, may be combined with each other in different ways. In other words, different devices, components, and operations may be used together according to other example embodiments, although not specifically stated.

The steps or operations in the flow diagrams described herein are just for example. There may be many variations to these steps or operations without departing from the spirit of the invention or inventions. For instance, the steps may be performed in a differing order, or steps may be added, deleted, or modified.

Although the above has been described with reference to certain specific embodiments, various modifications thereof will be apparent to those skilled in the art without departing from the scope of the claims appended hereto.

What is claimed is:

1. An integrated ground surface system for collecting and recycling de-icing fluid, the system comprising:
   a liquid permeable ground surface pavement layer;
   a liquid permeable aggregate layer beneath and supporting the pavement layer;
   a liquid impermeable liner layer beneath the aggregate layer;
   at least one reservoir adapted to receive liquid permeating through the pavement and aggregate layers and collected above the liner layer, the liquid including the de-icing fluid; and
   at least one first applicator device in fluid communication with the at least one reservoir to dispense the liquid received in the at least one reservoir over the pavement layer.

2. The system of claim 1, the pavement layer comprises:
   a permeable concrete layer;
   permeable interlocking paving stones; and/or
   a permeable asphalt layer.

3. The system of claim 1 further comprising at least one pump to pump the liquid from the reservoir to the at least one first applicator device.

4. The system of claim 1 further comprising at least one of the following:
   a sensor to detect de-icing compound concentration in the fluid in the reservoir; and
   a sensor to detect a volume of the fluid in the reservoir.

5. The system of claim 1 further comprising at least one of the following:
   at least one first de-icing compound tank and at least one second applicator device to dispense a de-icing compound from the at least one first tank onto the pavement layer; and/or
   at least one second de-icing compound tank and at least one dispensing device to dispense the de-icing compound from the at least one second tank into the at least one reservoir.

6. The system of claim 1, wherein the at least one reservoir further includes at least one of the following:
   an outlet and a valve that controls the release of the liquid in the reservoir into subsoil; and
   an outlet and a valve that controls the release of the liquid in the reservoir into a sewage system.

7. The system of claim 1 further comprising a processor and one or more sensors in communication with the processor, wherein the one or more sensors monitor the at least one reservoir, and wherein the processor controls dispensing of the fluid from one or more of the applicator devices in response to data detected by the one or more sensors.

8. The system of claim 1 further comprising a conduit leading from the reservoir to an outlet above the pavement layer for outputting the liquid in the reservoir, the outlet being ancillary to the at least one first applicator device.

9. The system of claim 1, wherein the de-icing fluid is de-icing brine.

10. The system of claim 1, wherein the aggregate layer includes piping for conveying at least a portion of the liquid to the at least one reservoir.

11. The system of claim 1, wherein the liquid impermeable liner layer has a first side proximal to the at least one reservoir and an opposite second side and wherein the first side is provided at a lower elevation than the second side.

12. An integrated ground surface system for collecting and recycling de-icing fluid, the system comprising:
   a liquid permeable ground surface pavement layer;
   a liquid permeable aggregate layer beneath and supporting the pavement layer;
   a liquid impermeable liner layer beneath the aggregate layer;
   at least one reservoir adapted to receive liquid permeating through the pavement and aggregate layers and collected above the liner layer, the liquid including the de-icing fluid;

at least one first applicator device in fluid communication with the at least one reservoir to dispense the liquid received in the at least one reservoir over the pavement layer;

at least one first tank for storing a de-icing compound;

at least one second applicator device to dispense the de-icing compound from the at least one first tank onto the pavement layer;

at least one dispensing device to dispense the de-icing compound from the at least one first tank into the at least one reservoir; and a processor one or more sensors in communication with the processor, wherein the one or more sensors monitor the at least one reservoir, wherein the processor controls at least one of the following in response to data received from the one or more sensors:

dispensing the liquid from the at least one first applicator device;

dispensing the de-icing compound from the at least one second applicator device; and dispensing the de-icing compound from the at least one first tank into the at least one reservoir using the dispensing device.

13. The system of claim 12, wherein the at least one reservoir further includes at least one underground outlet and a respective valve that controls the release of the liquid in the at least one reservoir into a sewage system or subsoil; and wherein the at least one reservoir is connected to a conduit leading from the reservoir to an outlet for dispensing the de-icing fluid over the pavement layer, the outlet being ancillary to the at least one first applicator device.

14. The system of claim 13, wherein the processor controls at least one of the following in response to data received from the one or more sensors: the first applicator device, the underground outlet, and the outlet above the permeable ground surface.

15. The system of claim 13, wherein the de-icing fluid is de-icing brine.

16. The system of claim 12 further comprising a pump to pump the liquid from the at least one reservoir to the at least one first applicator device.

17. The system of claim 12, wherein the aggregate layer includes piping for conveying at least a portion of the liquid to the at least one reservoir.

18. The system of claim 12, wherein the liquid impermeable liner layer has a first side proximal to the at least one reservoir and an opposite second side and wherein the first side is provided at a lower elevation than the second side.

19. A method for collecting and recycling de-icing fluid with an integrated ground system, the method comprising:

at least one of receiving the de-icing fluid or forming the de-icing fluid on a permeable ground pavement layer;

allowing the de-icing fluid to permeate through the pavement layer and through an aggregate layer beneath the pavement layer;

preventing further permeation of the de-icing fluid at an impermeable liner layer beneath the aggregate layer;

directing the de-icing fluid to at least one reservoir to collect the de-icing fluid; and dispensing the collected de-icing fluid from the reservoir on the pavement layer.

20. The method of claim 19, wherein the de-icing fluid is de-icing brine.

* * * * *